May 11, 1926.
M. W. McCONKEY
VEHICLE BRAKE
Filed May 23, 1925
1,584,111
3 Sheets-Sheet 1
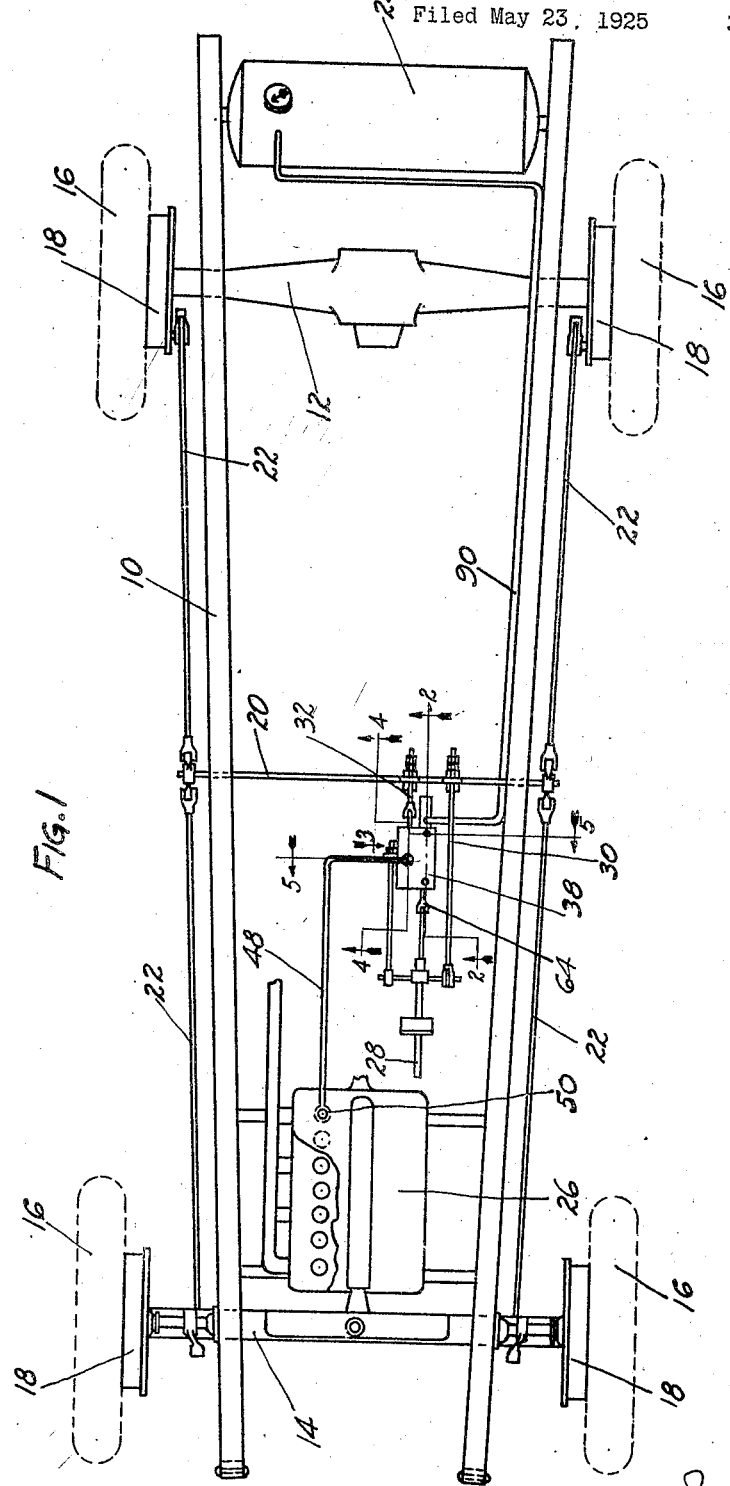
INVENTOR
Montgomery W. McConkey May 11, 1926.
M. W. McCONKEY
1,584,111
VEHICLE BRAKE
Filed May 23, 1925     3 Sheets-Sheet 2
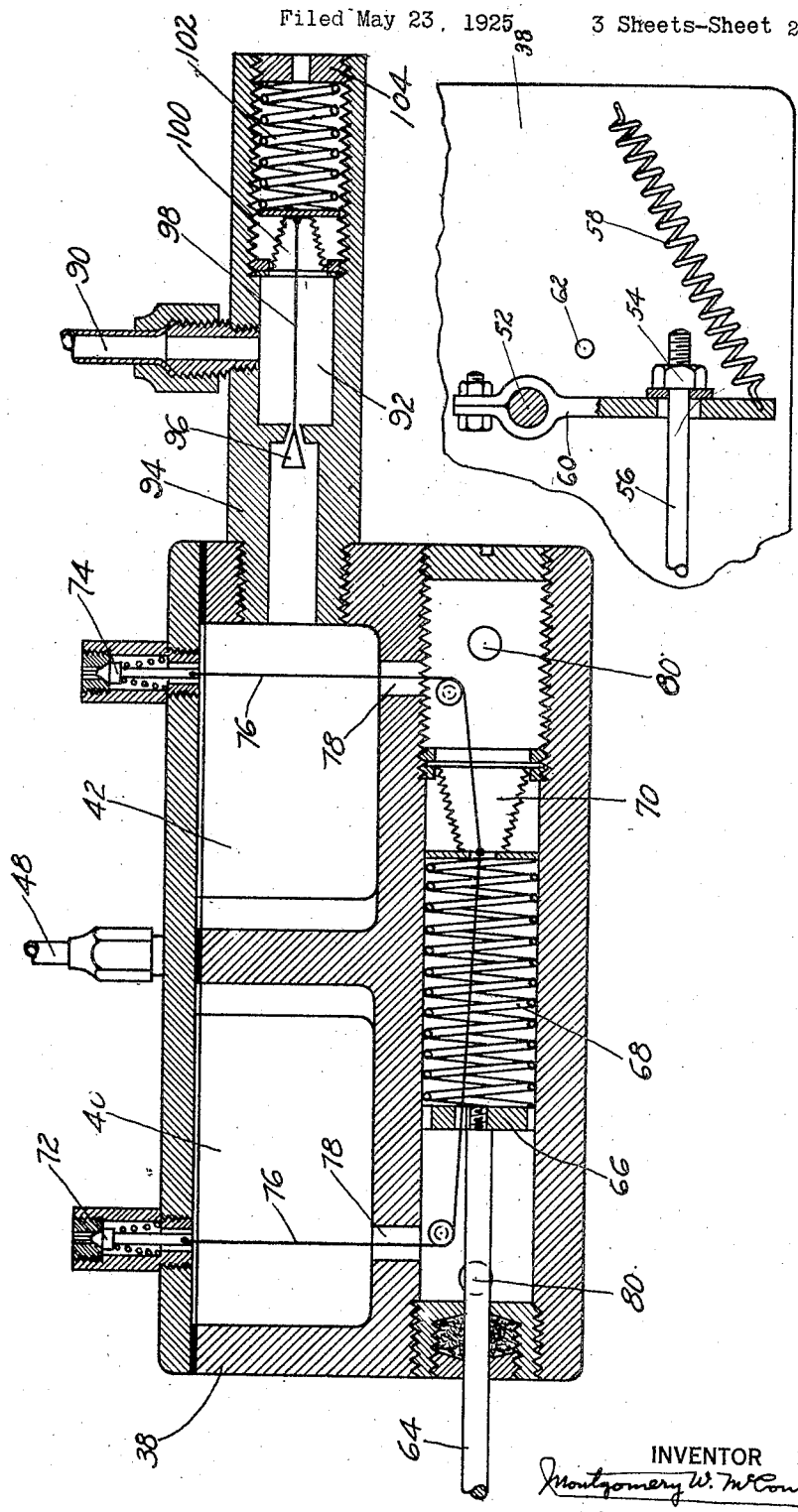
INVENTOR
Montgomery W. McConkey

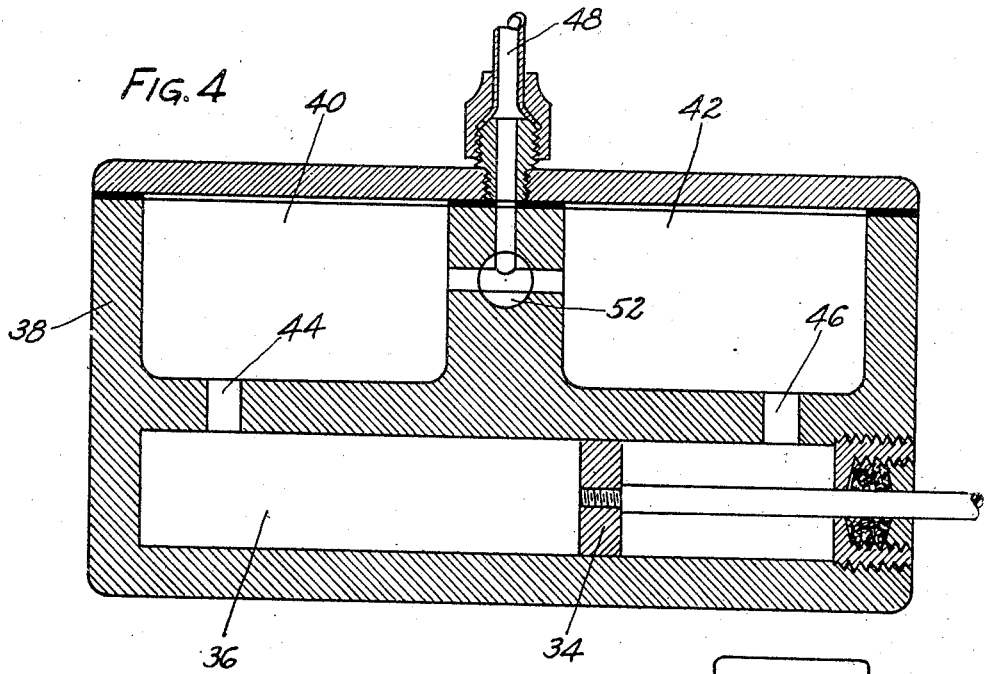
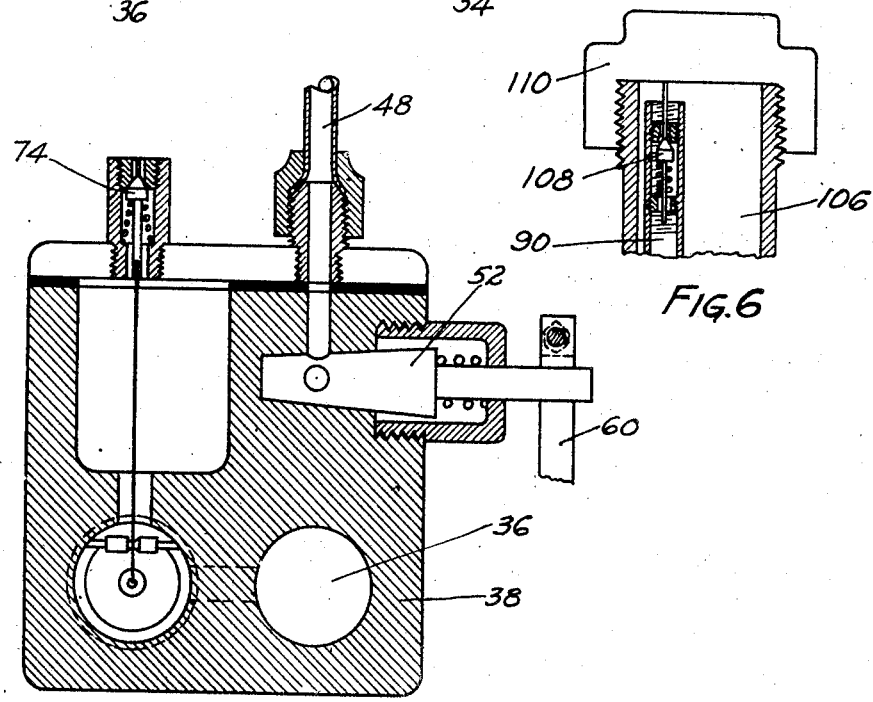

Patented May 11, 1926.

1,584,111

UNITED STATES PATENT OFFICE.

MONTGOMERY W. McCONKEY, OF CHICAGO, ILLINOIS, ASSIGNOR TO BENDIX BRAKE COMPANY, OF CHICAGO, ILLINOIS, A CORPORATION OF ILLINOIS.

VEHICLE BRAKE.

Application filed May 23, 1925. Serial No. 32,317.

This invention relates to brakes, and is illustrated as embodied in an automobile chassis. An object of the invention is to provide a powerful auxiliary or servo device for applying the brakes, which will act without appreciable lag and which can be accurately controlled to give any desired pressure on the brakes. In one very effective arrangement, a piston or other power device connected to the brakes is acted on by opposed balanced forces, for example by fluid at the same pressure on both sides of the piston, and the controlling means acts to unbalance the forces, as by exhausting the fluid on one side of the piston, to apply the brakes by power. Important features of the invention relate to arrangements for graduating the control, preferably so that the power applied to the brakes is a predetermined multiple of the force exerted by the driver.

Other objects and features of the invention, including a novel arrangement for delivering a reduced uniform fluid pressure to the fuel tank from the brake mechanism, for the purpose of feeding the fuel, and other new combinations of parts and desirable particular constructions, will be apparent from the following description of one illustrative embodiment shown in the accompanying drawings, in which:

Figure 1 is a diagrammatic top plan view of an automobile chassis embodying the invention;

Figure 2 is a vertical section through the servo on the line 2—2 of Figure 1;

Figure 3 is a partial side elevation of the servo, looking in the direction of the arrow 3, Figure 1;

Figure 4 is a vertical section through the servo on the line 4—4, Figure 1;

Figure 5 is a transverse vertical section through the servo on the line 5—5, Figure 1; and Figure 6 is a vertical section through the top of the filler spout of the fuel tank.

In the arrangement selected for illustration, the chassis comprises a frame 10 supported by the usual springs on a rear axle 12 and a front axle 14 carried by the road wheels 16. The brakes 18, shown acting on the road wheels 16, may be operated from a rockshaft 20 by a linkage 22. The fuel tank is shown at 24, and the engine at 26.

The shaft 20 may be rocked to apply the brakes 18 by depressing a pedal 28 or the like shown as operating a link 30 having an over-running connection with an arm on shaft 20. The shaft is ordinarily, however, operated by a link 32 from a piston 34 (Figure 4) in a cylinder 36 in a power or servo device 38.

The power device 38 contains two fluid reservoirs 40 and 42 communicating respectively by ports 44 and 46 with opposite ends of cylinder 36. Ordinarily the cylinder 36 and the bottom of the two reservoirs will be filled with oil or other liquid, although this is not essential in the broader aspects of the invention, and would not be used, for example, if reservoirs 40 and 42 were connected to the intake manifold to maintain the fluid in them at sub-atmospheric pressure.

I have shown the fluid in these reservoirs, however, as compressed at super-atmospheric pressure, and being introduced into the reservoirs by a conduit 48 from a check valve 50 in an engine cylinder, or from a suitable air compressor. Conduit 48 opens through a rotatable valve 52, normally held, by a nut 54 (Figure 3) on a link 56 from the brake pedal 28 against the resistance of a spring 58, in the position shown in Figure 4, in which reservoirs 40 and 42 are in communication with each other and both are in communication with conduit 48. Thus normally the pressure on opposite sides of piston 34 is the same. When pedal 28 is depressed, spring 58 rocks arm 60 of valve 52 against a stop 62, cutting off communication between the two reservoirs 40 and 42 and between both reservoirs and conduit 48.

The pressure in the two reservoirs is controlled from pedal 28 or its equivalent by means such as is shown in one embodiment in Figure 2. In the illustrated arrangement, a link 64 operated by the pedal has a head 66 engaging and compressing a spring 68 against a diaphragm 70, shown as one of the corrugated metal bellows known commercially as a sylphon tube. Diaphragm 70 is connected to two exhaust valves 72 and 74, one in each of the reservoirs 40 and 42, by means shown diagrammatically as wires 76, so that movement of the diaphragm to the right will place reservoir 40 in the communication with the atmosphere, while movement to the left will place reservoir 42 in communication with the atmosphere. In a central neutral position of the diaphragm, both exhaust valves 72 and 74 are closed. The cylinder containing the above described controlling mechanism is submerged in the oil, when oil is used, and communicates with the reservoirs through ports 78 and with opposite ends of the power cylinder 36 by ports 80.

In operation, the gases in the reservoir are normally at a high pressure. Depression of the brake pedal first allows spring 58 to close valve 52. As spring 68 is compressed, valve 72 is opened, the pressure in reservoir 40 is reduced, and the difference in pressure between reservoirs 40 and 42 forces piston 34 to the left (Figure 4) to apply the brakes. As soon as the greater pressure in reservoir 42 balances the pressure on spring 68, diaphragm 70 is forced back to its neutral position against the resistance of spring 68, and the brakes are held on with a pressure which is a predetermined multiple of the pressure on the brake pedal.

If now more pressure is exerted on the brake pedal, the same operation is repeated, and the parts again balance with a corresponding greater pressure on the brakes. If the pressure on the pedal is relieved, the excess pressure in reservoir 42 forces the diaphragm to the left to open valve 74, until the excess pressure in reservoir 42 again just balances the pressure on spring 68. When the pedal is entirely released, equal pressure in the two reservoirs is immediately re-established by the return of valve 52 to the position shown in Figure 4.

One feature of the invention relates to maintaining in the tank 24 a low fuel-feeding pressure from the high pressure maintained in the brake-applying means. The tank and the servo are connected by a conduit 90 opening from a small reservoir 92 in a novel pressure-reducing valve 94 threaded into one end of reservoir 42. The valve proper is shown diagrammatically at 96, and is connected by a rigid link 98 to a second sylphon or other diaphragm 100 constantly compressed by a spring 102 held by an adjustable threaded plug 104. By turning up plug 104 more or less, a greater or less constant pressure is exerted on diaphragm 100 tending to open valve 96 to admit compressed gas to tank 24. When the pressure in reservoir 92 just balances the pressure of spring 102, valve 96 is automatically closed.

Preferably conduit 90 opens in the filler spout 106 of the fuel tank, and has a check valve 108 normally held open by engagement with the filler cap 110. When cap 110 is removed to refill the tank, valve 108 prevents emptying reservoir 42 of its compressed gas. When cap 110 is replaced, the desired low fuel-feeding pressure is automatically reestablished in the fuel tank.

While one illustrative embodiment of the invention has been described in detail, it is not my intention to limit its scope to that particular embodiment, or otherwise than by the terms of the appended claims.

I claim:

1. A vehicle having, in combination, brakes, means for operating the brakes including a power-operated member, two reservoirs for fluid at other than atmospheric pressure and acting in opposite directions on said member, the pressures in said reservoirs normally being balanced, and means for placing one reservoir in communication with the atmosphere to apply the brakes and for placing the other reservoir in communication with the atmosphere to relieve the pressure on the brakes.

2. A vehicle having, in combination, brakes, means for operating the brakes including a power-operated member, two reservoirs for fluid at other than atmospheric pressure and acting in opposite directions on said member, normally open means for connecting the reservoirs to balance the pressure, means for simultaneously disconnecting the reservoirs and for placing one reservoir in communication with the atmosphere to apply the brakes, and an operating pedal arranged to have a slight lost motion to operate said second means and then, if power is insufficient, to apply the brakes manually.

3. A vehicle having, in combination, brakes, means for operating the brakes including a power-operated member, two fluid reservoirs containing fluid acting on opposite sides of said member, means for compressing fluid at substantially equal pressures in said reservoirs, and means for selectively exhausting the reservoirs to the atmosphere to apply and release the brakes.

4. A vehicle having, in combination, brakes, means for operating the brakes including a power-operated member, two fluid reservoirs containing fluid acting on opposite sides of said member, means for compressing fluid at substantially equal pressures in said reservoirs, and means for exhausting one or the other reservoir to the atmosphere to establish a graduated difference in the pressures acting in opposite directions on said member to apply the brakes.

5. A vehicle having, in combination, brakes, means for operating the brakes including a power-operated member, two fluid reservoirs containing fluid acting on opposite sides of said member, means for establishing equal pressures other than atmospheric pressure in the reservoirs to balance the forces acting on said member, a valve for placing one reservoir in communication with the atmosphere, and driver-controlled pressure-responsive means for opening and closing the valve to apply the brakes with a graduated pressure determined by the driver.

6. A vehicle having, in combination, brakes, means for operating the brakes including a power-operated member, two fluid reservoirs containing fluid acting on opposite sides of said member, means for establishing equal pressures other than atmospheric pressure in the reservoirs to balance the forces acting on said member, a valve for placing each reservoir in communication with the atmosphere, and driver-controlled means for opening one valve to apply the brakes and for opening the other valve to release the brakes.

7. A vehicle having, in combination, brakes, means for operating the brakes including a power-operated member, two fluid reservoirs containing fluid acting on opposite sides of said member, means for establishing equal pressures other than atmospheric pressure in the reservoirs to balance the forces acting on said member, a valve for placing each reservoir in communication with the atmosphere, a driver-operated controlling member, means operated by movement of the controlling member in one direction to open one of the valves, means operated by movement of the controlling member in the other direction to open the other valve, and means for closing the valves.

8. A vehicle having, in combination, brakes, means for operating the brakes including a power-operated member, two fluid reservoirs containing fluid acting on opposite sides of said member, means for establishing equal pressures other than atmospheric pressure in the reservoirs to balance the forces acting on said member, a valve for placing each reservoir in communication with the atmosphere, a driver-operated controlling member, means operated by movement of the controlling member in one direction to open one of the valves, means for automatically closing said valve after the pressure in the reservoir has changed by an amount determined by the extent of movement of the controlling member, means operated by movement of the controlling member in the other direction to open the other valve, and means for closing the said other valve when the pressures in the reservoirs are again at a differential determined by the position of the controlling member.

9. A vehicle having, in combination, brakes, means for operating the brakes including a power-operated member, two fluid reservoirs containing fluid acting on opposite sides of said member, means for establishing equal pressures other than atmospheric pressure in the reservoirs to balance the forces acting on said member, a valve for placing each reservoir in communication with the atmosphere, a driver-operated controlling member, means operated by movement of the controlling member in one direction to open one of the valves, means operated by movement of the controlling member in the other direction to open the other valve, means for closing the valves, and means automatically operated on movement of the controlling member to initial position to place the two reservoirs in communication with each other to balance the pressure in the reservoirs.

10. A vehicle having, in combination, brakes, means for operating the brakes including a power-operated member, two fluid reservoirs containing fluid acting on said member in opposite directions, means for establishing equal pressures other than atmospheric pressure in said reservoirs to balance the forces acting on said member, a spring, valve means operated by distortion of the spring to differentiate the pressures in the two reservoirs in an amount determined by distortion of the spring, and means for distorting the spring to cause said member to apply the brakes.

11. A vehicle having, in combination, brakes, means for operating the brakes including a power-operated member, two fluid reservoirs containing fluid acting on said member in opposite directions, means for establishing equal pressures other than atmospheric pressure in said reservoirs to balance the forces acting on said member, a spring, valve means operated by distortion of the spring to differentiate the pressure in the two reservoirs in an amount proportional to the force acting on the spring, and means for distorting the spring to cause said member to apply the brakes.

12. A vehicle having, in combination, brakes, means for operating the brakes including a power-operated member, two fluid reservoirs containing fluid acting on said member in opposite directions, means for establishing equal pressures other than atmospheric pressure in said reservoirs to balance the forces acting on said member, a spring, valve means operated by distortion of the spring to differentiate the pressures in the two reservoirs in an amount proportional to the force acting on the spring, and a driver-operated part for distorting the spring more or less to apply the brakes with a graduated pressure in proportion to the force exerted by the driver.

13. A vehicle having, in combination, brakes, means for operating the brakes including a power-operated member, two fluid reservoirs containing fluid acting on said member in opposite directions, means for establishing equal pressures other than atmospheric pressure in said reservoirs to balance the forces acting on said member, a spring, valve means operated by distortion of the spring to differentiate the pressures in the two reservoirs in an amount proportional to the force acting on the spring, a driver-operated part for distorting the spring more or less to apply the brakes with a graduated pressure in proportion to the force exerted by the driver, and auxiliary connections from said part for applying the brakes manually in case of insufficient fluid pressure.

14. A vehicle having, in combination, brakes, means for operating the brakes including a power-operated member, two fluid reservoirs containing fluid acting on said member in opposite directions, means for establishing equal pressures other than atmospheric pressure in said reservoirs to balance the forces acting on said member, a pressure-responsive device communicating on opposite sides with the two reservoirs, a valve for each reservoir, the valves being operated by said pressure-responsive device and one valve being operated by increase of pressure in one direction on said device and the other valve being operated by increase of pressure thereon in the opposite direction, and means for increasing the pressure on said device in one direction more or less to operate the corresponding valve to place one reservoir in communication with the atmosphere to differentiate the pressure on opposite sides of the power-operated member to apply the brakes.

15. A vehicle having, in combination, brakes, means for operating the brakes including a power-operated member, two fluid reservoirs containing fluid acting on said member in opposite directions, means for establishing equal pressures other than atmospheric pressure in said reservoirs to balance the forces acting on said member, a pressure-responsive device communicating on opposite sides with the two reservoirs, a valve for each reservoir, the valves being operated by said pressure-responsive device and one valve being operated by increase of pressure in one direction on said device and the other valve being operated by increase of pressure thereon in the opposite direction, and means for yieldingly increasing the pressure on said device in one direction more or less to operate the corresponding valve to place one reservoir in communication with the atmosphere to differentiate the pressure on opposite sides of the power-operated member to apply the brakes, said pressure-responsive device automatically closing the valve again when the pressure on the brakes is a predetermined multiple of the increase in pressure on said device.

16. A power device comprising, in combination, a power piston, two fluid reservoirs communicating with opposite sides of the piston and normally containing fluid at balanced pressures, a valve for placing each reservoir in communication with the atmosphere, a pressure-responsive device between and in communication on opposite sides with the two reservoirs, connections from said device to the two valves, and means yieldingly acting on the pressure-responsive device to cause one valve to be opened thereby, to change the pressure on one side of the piston in an amount determined by the pressure of said means on the pressure-responsive device.

17. A power device comprising, in combination, a power piston, two fluid reservoirs communicating with opposite sides of the piston and normally containing fluid at balanced pressures, a valve for placing each reservoir in communication with the atmosphere, a pressure-responsive device between and in communication on opposite sides with the two reservoirs, connections from said device to the two valves, a spring arranged to act on the pressure-responsive device, and controlling means including a plunger for compressing the spring against said device.

18. A power device comprising, in combination, a piston and cylinder, two reservoirs communicating with the cylinder on opposite sides of the piston, a liquid filling the cylinder and submerging the piston and rising part way into the reservoirs, means for supplying compressed gas at balanced pressures to the two reservoirs, and means for effecting the graduated exhaust of the gas from one reservoir to cause a difference in the pressures acting in opposite directions on the piston.

19. A power device comprising, in combination, a piston and cylinder, two reservoirs communicating with the cylinder on opposite sides of the piston, a liquid filling the cylinder and submerging the piston and rising part way into the reservoirs, means for supplying compressed gas at balanced pressures to the two reservoirs, an exhaust valve for each reservoir, and means including a controlling member for controlling the two valves to establish and maintain a difference in pressure in the two reservoirs and for reacting on the controlling member in proportion to said difference in pressure.

In testimony whereof I have hereunto signed my name.

MONTGOMERY W. McCONKEY.